No. 794,408. PATENTED JULY 11, 1905.
W. HULL.
CULTIVATOR.
APPLICATION FILED JUNE 18, 1904.
2 SHEETS—SHEET 1.
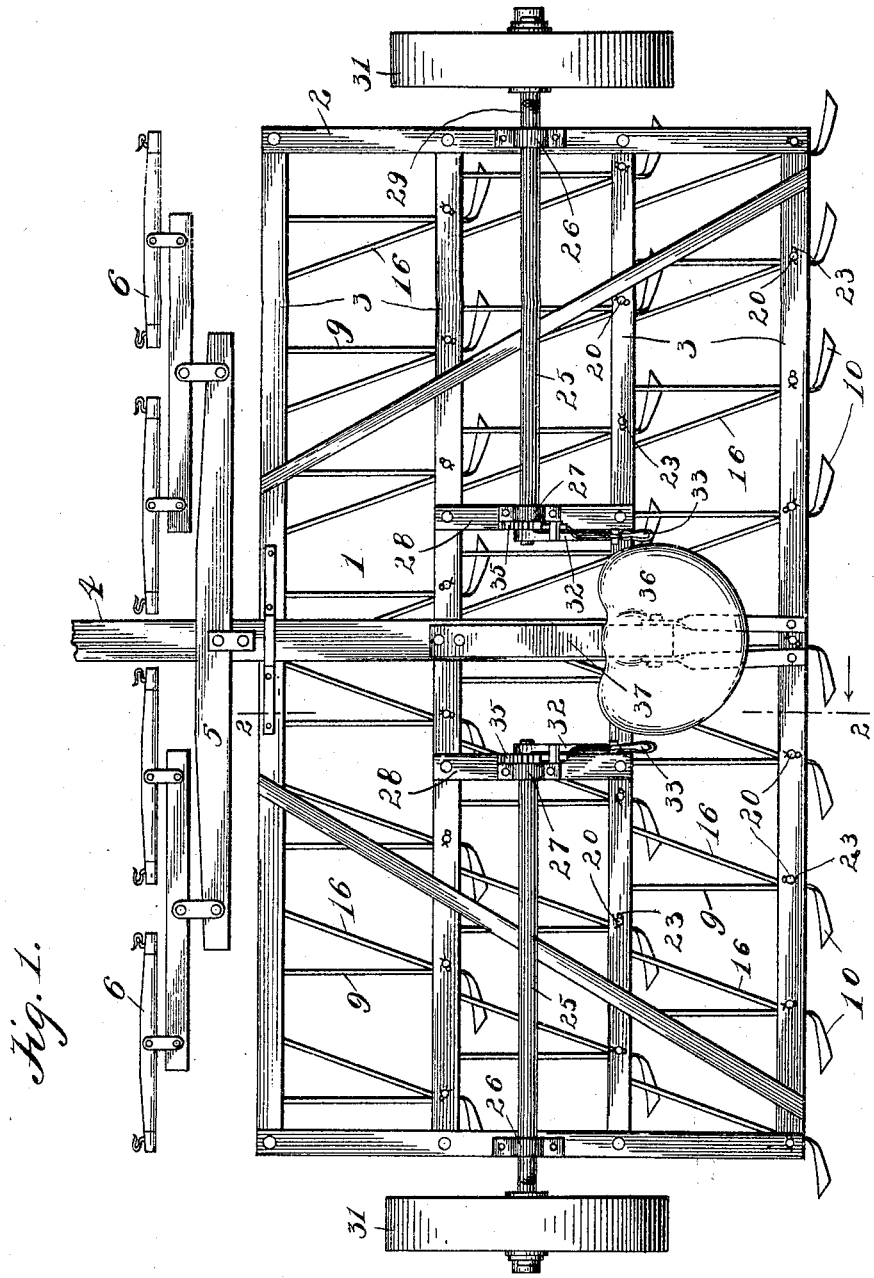
Witnesses: William Hull, Inventor,
By Marion & Marion
Attorneys

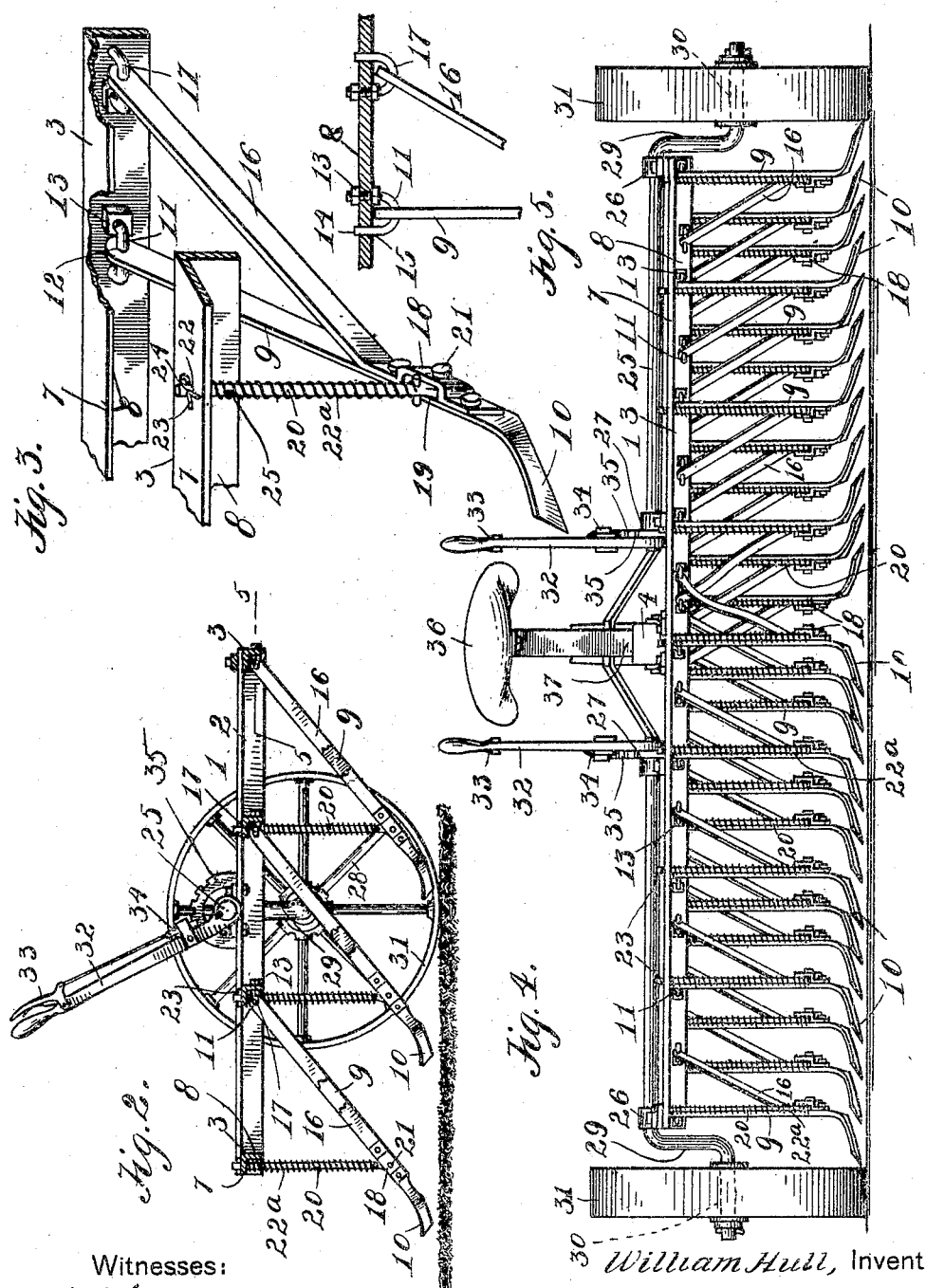

No. 794,408. Patented July 11, 1905.

UNITED STATES PATENT OFFICE.

WILLIAM HULL, OF SOURIS, CANADA.

CULTIVATOR.

SPECIFICATION forming part of Letters Patent No. 794,408, dated July 11, 1905.

Application filed June 18, 1904. Serial No. 213,063.

*To all whom it may concern:*

Be it known that I, WILLIAM HULL, a subject of the King of Great Britain, residing at Souris, county of Brandon, in the Province of Manitoba, Canada, have invented certain new and useful Improvements in Cultivators; and I do hereby declare that the following is a full, clear, and exact description of the invention, such as will enable others skilled in the art to which it appertains to make and use the same.

My invention relates to cultivators such as used upon farms and plantations for tilling the soil or for similar purposes.

The object of the invention is to produce an implement of simple construction comprising a plurality of colters or blades adapted to be drawn through the soil, special arrangements being made for regulating the depth to which these colters penetrate beneath the surface.

In its general construction the invention comprises a frame or body adapted to be drawn along by horses, and this frame comprises several cross-bars, to which are attached a plurality of colters or blades. The invention concerns itself especially with the manner of attaching these colters and in a certain construction of the parts which facilitates the ready adjustment of the frame, so as to regulate the depth to which the colters descend into the earth. This adjustment is attained by means of a pair of oppositely-disposed shafts rotatably mounted in the frame, the ends whereof are offset and carry the wheels which support the frame upon the ground. Arrangement is made for locking these shafts in different angular positions corresponding to different heights of the frame, as will be described.

The invention consists in the construction and combination of parts, to be more fully described hereinafter and definitely set forth in the claims.

Figure 1 is a plan representing the pole of the implement as broken away. Fig. 2 is a section through the body of the implement, supposed to be taken substantially on the line 2 2 of Fig. 1. Fig. 3 is a perspective view representing a fragment of the body and showing the manner in which the colters are formed and attached to the cross-bars referred to above. This view is of the nature of a section and is upon an enlarged scale, as will appear. Fig. 4 is a rear elevation of the implement. Fig. 5 is a horizontal section supposed to be taken substantially upon the line 5 5 of Fig. 2, as will appear. This view is upon an enlarged scale.

Throughout the drawings and specification the same numerals of reference denote like parts.

Referring more particularly to the parts, 1 represents the body of the implement, which, as shown, consists, substantially, of a rectangular frame 2, preferably constructed of angle-iron and comprising a plurality of transverse bars 3. This frame has suitably attached thereto a pole 4, to which pole the draft-equalizer 5 is attached, the same carrying swingletrees 6, preferably four in number, and adapting the implement to be drawn by four horses. While I have shown the draft apparatus for four horses, it should be understood that this feature is immaterial and arrangement could be as well made for two, three, or any other number of horses to draw the implement.

As shown, the transverse bars 3 are preferably formed of angle-iron with horizontally-disposed webs 7 and vertical flanges 8. Four of these transverse bars have been shown, but any other number could be used suited to the particular requirements. To the rear sides of the foremost three of the bars 3 there are attached a plurality of colter bars or handles 9, which are preferably formed of steel and which terminate below in laterally-extending blades or knives 10, preferably of substantially the form shown. It should be understood that as the implement is drawn along these colters are adapted to cut into the soil, and they would be given a special form adapted to plow up or till the soil as they pass. These colter-bars are attached by means of U-bolts 11, which pass through openings 12, as shown, the said U-bolts having a threaded leg which passes through the flange 8 and enables the U-bolt to be clamped in position by means of the nuts 13. The other leg 14 of the U-bolt is plain, as shown, and passes through an opening 15. From this arrangement the bars are securely attached in a simple manner.

The colter-bars 9 are disposed in inclined positions, as shown, so that their blades lie upon or near the ground, and braces 16 are attached to the sides of the said colter-bars in the manner indicated, the forward extremities of these braces being attached to U-bolts 17, which are substantially similar in construction to the U-bolts 11 aforesaid and are attached in the manner as indicated. The lower extremities of these braces are formed into feet 18, and each of these feet is offset to form a socket 19, in which socket there is loosely secured a presser-rod 20 by means of a suitable pin 21. For the purpose of guiding the upper extremity of these presser-rods 20 openings 22 are formed in the webs 7 of the transverse bars through which the presser-rods pass, and each presser-rod is enveloped in a helical spring $22^a$, which thrusts at its lower end upon the foot 18 and at its upper end against the under side of the web 7 in such a manner as to force the colter toward the ground. Split pins 23 are inserted through openings 24 in the protruding extremities of the presser-rods, so as to prevent their being removed by the springs, and similar pin-holes 25 are provided a few inches below the holes 24, in order to enable each of the colters to be maintained in the same elevated position by means of its split pin, and it should be stated that this arrangement is adopted for the purpose of enabling the colters to be raised when the implement is driven from place to place.

Near the middle portion of the body a pair of oppositely-disposed shafts or axles 25 are provided, the same being mounted in suitable bearings 26 upon the frame 2 at their outer extremities, and at their inner extremities similar bearings 27 are provided, the same being attached to the upper sides of cross-bars 28, as shown, which cross-bars connect two adjacent members of the transverse bars 3. These axles 25 are substantially identical in construction, and each axle comprises a crank or radial extension 29, and the extremities of these extensions are turned outwardly to form arms or spindles 30, upon which the wheels 31 are rotatably mounted, as indicated. At their inner extremities the axles 25 have rigidly-attached adjusting-levers 32, and each of these levers is provided with a finger-lever 33, which is adapted to operate locking mechanism 34, and these locking mechanisms coöperate, respectively, with toothed segments 35, which are attached to the cross-bars 28 in any suitable manner. Between the levers 32 a suitable seat 36 is provided, upon which the driver of the implement sits, and this seat is supported upon a suitable base 37. The levers 32 would, of course, be within easy reach of the driver, and by means of them he would be enabled to rotate either of the axles 35, so as to raise or lower the body of the implement upon the wheels, as will be readily understood, and having secured the proper adjustment as to height these levers will be locked, so as to maintain the frame in proper position.

It will appear that the colters are preferably disposed so that any colter will occupy an intermediate position with relation to the colter in advance or toward the rear, and, furthermore, it should be stated that the colter-blades in the right-hand portion of the implement preferably turn toward the right, while those in the left-hand portion of the implement turn toward the left. Also the braces 16 are preferably attached to the colter-bars on the side adjacent to the central line of the implement, so that these brace-bars incline toward the pole. The colter-bars preferably dispose themselves in a substantially front and rear direction, as shown.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim, and desire to secure by Letters Patent, is—

1. In an implement of the class described, in combination, a forward bar, a second bar disposed rearwardly with respect to the same, vertically-inclined colter-bars pivotally attached to said first bar, laterally-inclined braces attached to said colter-bars and pivotally attached to said first bar, colters formed at the extremities of said colter-bars, presser-rods attached to said colter-bars near the lower extremities thereof, said rear bar having openings therethrough constituting guides for said presser-rods, and springs disposed respectively about said presser-rods.

2. In an implement of the class described, in combination, a forward bar, a rear bar, U-bolts carried by said forward bar, vertically-inclined colter-bars pivotally attached to certain of said U-bolts, braces rigidly attached to said colter-bars and pivotally attached to the remaining U-bolts, colters formed at the extremities of said colter-bars, said braces having offset extensions constituting sockets, presser-rods attached in said sockets, and springs disposed about said presser-rods, said rear bar having openings therethrough constituting guides for said presser-rods.

3. In an implement of the class described, in combination, a forward bar, a rear bar, U-bolts carried by said forward bar, vertically-inclined colter-bars pivotally attached to certain of said U-bolts, laterally-inclined braces attached to said colter-bars and pivotally attached to the remainder of said U-bolts, presser-rods attached at the junction of said colter-bars and said braces, said rear bar having openings therethrough constituting guides for said presser-rods, springs disposed about said presser-rods and constraining said presser-rods downwardly, said presser-rods having openings near the extremities thereof, and pins passing through said openings above said rear bar.

4. In an implement of the class described, in combination, forwardly-disposed transverse angle-bars, rearwardly-disposed transverse angle-bars, the sides of said angle-bars being disposed respectively vertically and horizontally, colter-bars attached to the vertical member of said forward bars, presser-rods attached to said rear colter-bars, said rear bars having openings through the horizontal members thereof constituting guides for said presser-rods, and springs disposed about said presser-rods and forcing the same downwardly.

In witness whereof I have hereunto set my hand in the presence of two witnesses.

WILLIAM HULL.

Witnesses:
J. A. TAYLOR,
EDMUND P. VIAIL.